Aug. 26, 1947.        K. FISCHER         2,426,393
                      VISCOSIMETER
                   Filed Jan. 24, 1945         3 Sheets-Sheet 1
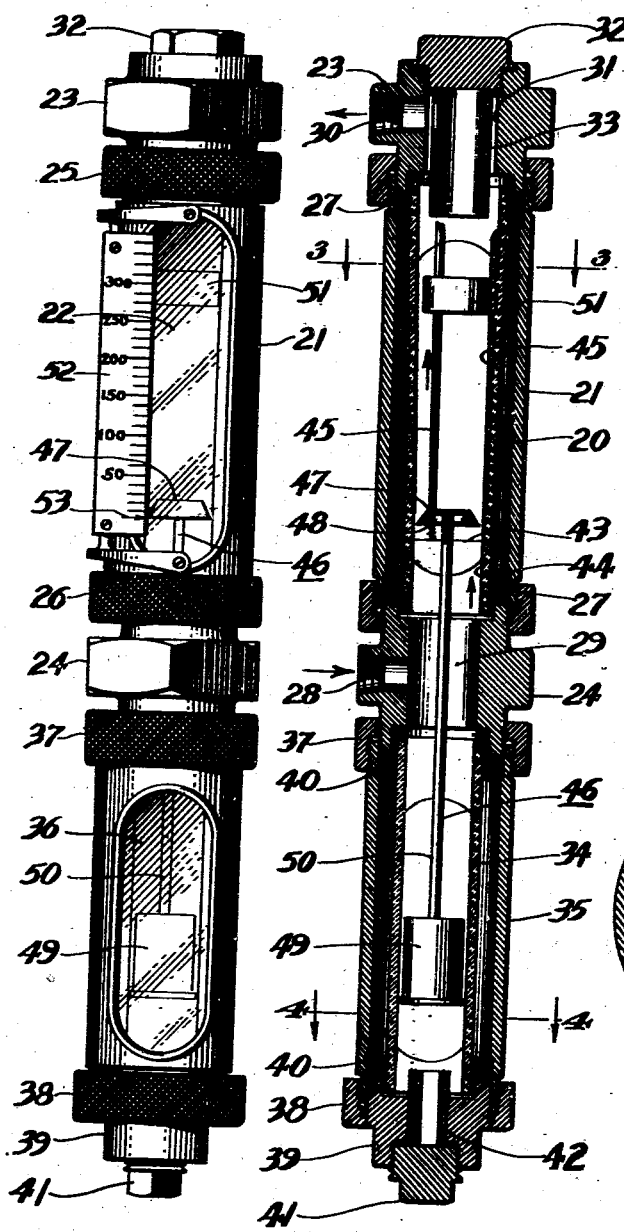
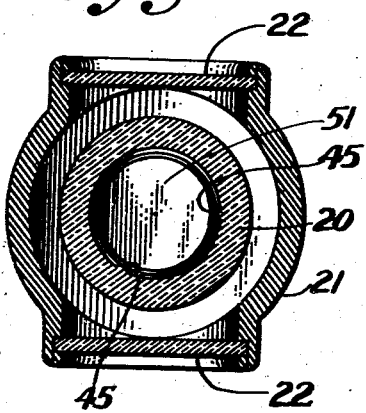
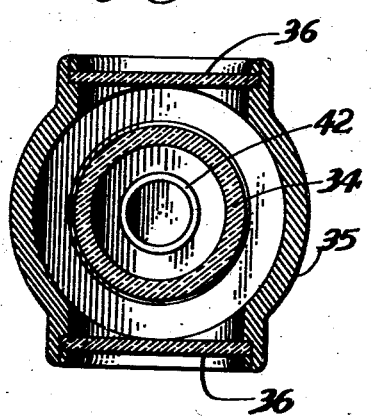
Inventor
KERMIT FISCHER

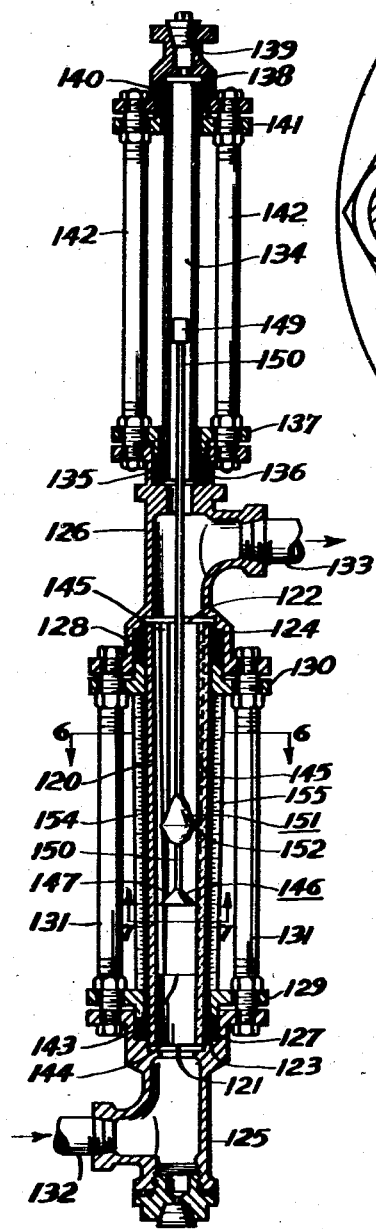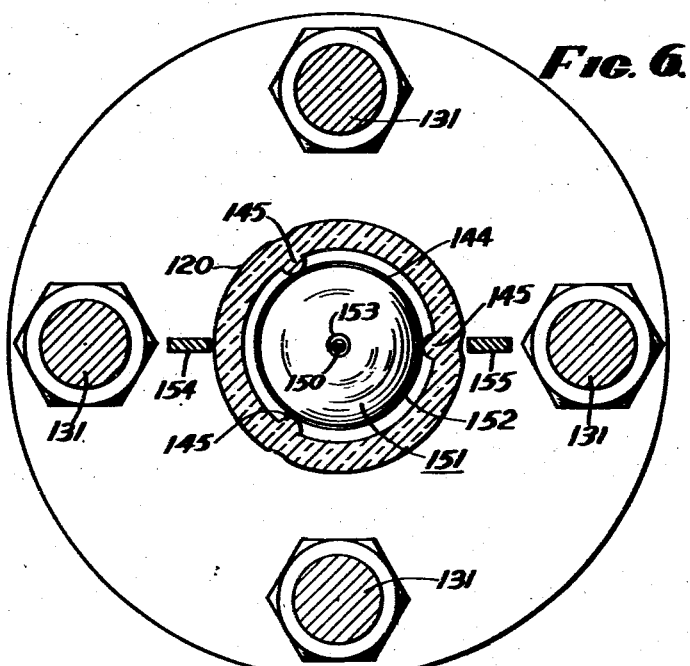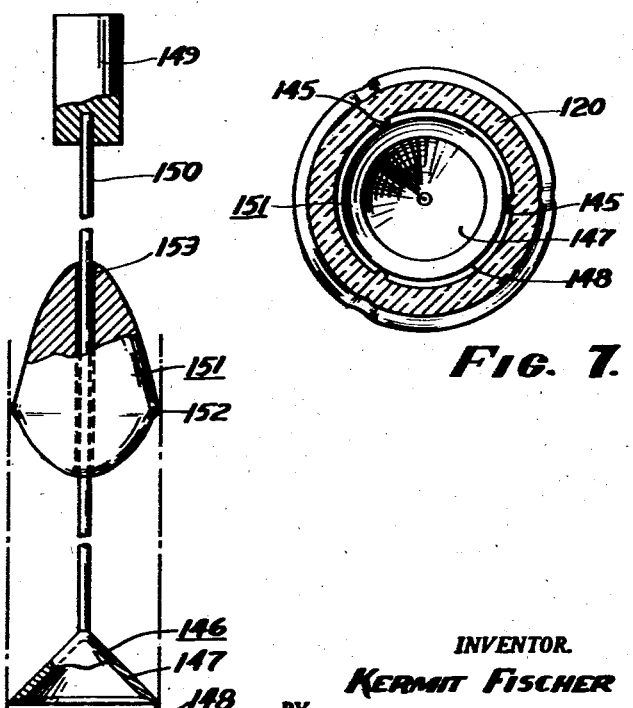

Aug. 26, 1947.  K. FISCHER  2,426,393
VISCOSIMETER
Filed Jan. 24, 1945  3 Sheets-Sheet 3
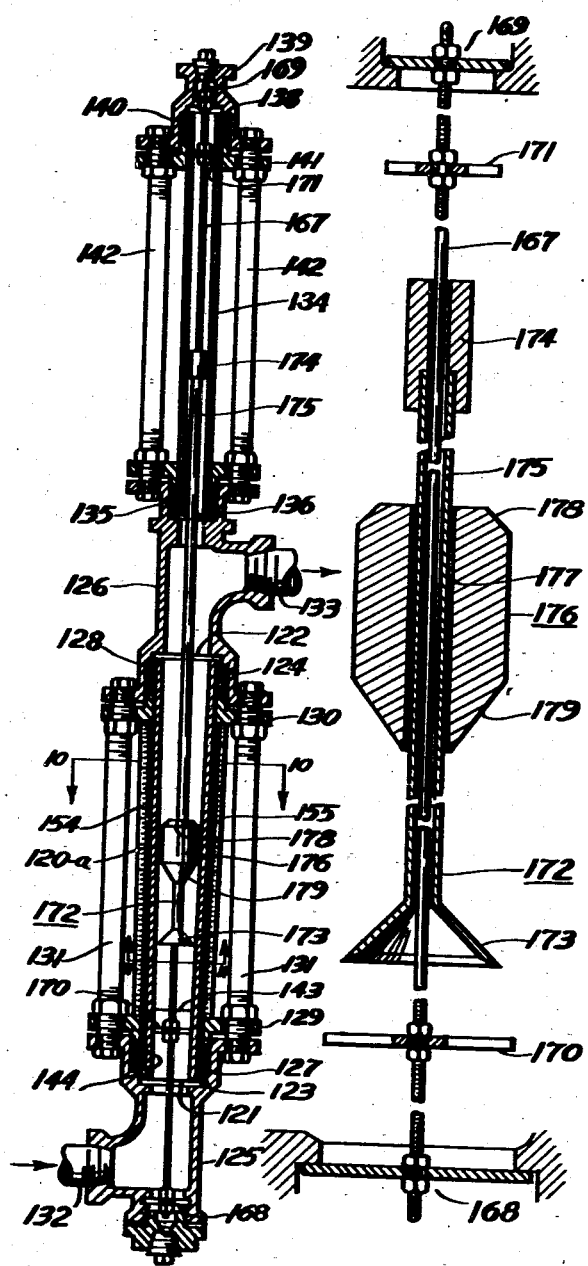
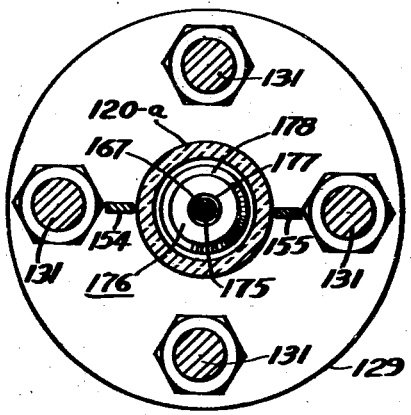
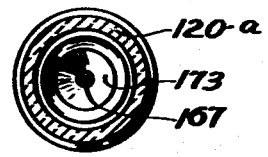
INVENTOR.
KERMIT FISCHER
BY Patented Aug. 26, 1947

2,426,393

UNITED STATES PATENT OFFICE 2,426,393

VISCOSIMETER

Kermit Fischer, Bridge Valley, Pa., assignor to Fischer & Porter Company, Hatboro, Pa., a corporation of Pennsylvania Application January 24, 1945, Serial No. 574,363

15 Claims. (Cl. 73—56)

The present invention relates to a certain new and useful apparatus for determining the viscosity of fluids in motion and it relates more particularly to the determination of the viscosity of a fluid while such fluid is in motion, as, for example, while said fluid is passing through a pipe-line.

An object of the present invention is to provide a simple, dependable and accurate apparatus for determining and maintaining a constant check upon the viscosity of a fluid in motion, as, for instance, fluids in transit in industrial chemical processes, without having to remove any of the fluids from the line. A further object of the present invention is to provide dependable and inexpensive apparatus for measuring and maintaining a constant check upon viscosity of fluids in motion, as, for instance, fluids in transit in pipe-lines in industrial chemical plants.

Other objects and advantages of the present invention will be apparent in the following detailed description, appended claims and accompanying drawings.

The present application is a continuation-in-part of my application Serial No. 535,626, filed May 15, 1944.

Generally speaking, according to my present invention, the viscosity of a flowing fluid can be determined by passing the fluid through a rotameter tube wherein are disposed two separate metering floats; one float being insensitive to, and unaffected by, variations in viscosity (so that its position is determined solely by the rate-of-flow of the fluid) and the other float being sensitive to, and affected by, variations in both viscosity and rate-of-flow. In this way, the viscosity of the flowing fluid can be determined by the difference in the positions of the two metering floats and the variations in the fluid viscosity can be determined by the corresponding variations in the difference of the positions of the two floats.

The present invention further provides a direct-reading viscosimeter wherein the rate-of-flow is adjusted to a predetermined value (as indicated by the position of the viscosity-insensitive float opposite a predetermined reference point) whereupon the viscosity of the flowing fluid is indicated directly by the position of the viscosity sensitive float relative to a suitably calibrated scale.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a front elevational view of one embodiment of the present invention.

Figure 2 represents a vertical cross-sectional view of the embodiment of Figure 1.

Figure 3 represents a horizontal cross-sectional view generally along the line 3—3 of Figure 2.

Figure 4 represents a horizontal cross-sectional view generally along the line 4—4 of Figure 2.

Figure 5 represents a vertical cross-sectional view of another embodiment of the present invention.

Figure 6 represents a horizontal cross-sectional view generally along the line 6—6 of Figure 5.

Figure 7 represents a horizontal cross-sectional view generally along the line 7—7 of Figure 5.

Figure 8 represents a schematic elevational view, on an enlarged scale, of the float assembly of Figure 5, parts being broken away better to reveal the construction thereof.

Figure 9 represents a vertical cross-sectional view of still another embodiment of the present invention.

Figure 10 represents a horizontal cross-sectional view generally along line 10—10 of Figure 9.

Figure 11 represents a horizontal cross-sectional view generally along the line 11—11 of Figure 9.

Figure 12 represents a schematic cross-sectinal view, on an enlarged scale, of the float assembly of Figure 9.

In one embodiment of the present invention shown in Figures 1 to 4, I may provide a rotameter including a vertical metering tube 20 of glass or other suitable transparent material enclosed by a metal housing 21 having transparent windows 22 therein. Upper and lower "heads" or fittings 23 and 24 are detachably connected at the ends of the housing 21 by means of screw-threaded collars 25 and 26 respectively which are adapted operatively to engage external screw threads formed on the ends of said housing 21. The collars are provided with inwardly-extending annular shoulders which cooperate with rings mounted on the outside of the fittings thereby to maintain said collars upon said fittings.

Gaskets or packing rings 27 are provided about the ends of the metering tube 20; the gaskets 27 being adapted to be axially compressed and radially-expanded upon tightening of the collars 25 and 26 thereby to provide a fluid-tight seal intermediate the ends of the metering tube 20 and the "heads" or fittings 23 and 24.

The lower head 24 is provided with an inlet opening 28 adapted for connection to a pipe-line or the like and has a conduit 29 extending vertically therethrough; the conduit 29 connecting with the inlet opening 28 and communicating with the lower end of the metering tube 20.

The upper head 23 is provided with an outlet opening 30 and has a vertical conduit 31 extending therethrough; the conduit 31 connecting with the outlet opening 30 and communicating, at its lower end, with the upper end of the metering tube 20. The upper end of the conduit 31 is closed by means of a screw-threaded plug 32.

An apertured sleeve 33 extends downwardly within the conduit 31 and into the upper end of the metering tube 20; the sleeve 33 serving as an upper stop for a metering float to be hereinafter described.

A generally cylindrical extension tube 34 of glass or other suitable transparent material is disposed below the metering tube 20 and in generally vertical alignment therewith. The extension tube 34 is enclosed within a metal housing 35 having windows 36 therein.

The upper end of the extension housing 35 is externally screw-threaded and is adapted adjustably to be engaged by a collar 37 provided at the lower end of the head 24.

The lower end of the extension housing 35 is also externally screw-threaded and is adapted to be operatively engaged by the screw-threaded collar 38 of a lowermost extension fitting 39.

Gaskets or packing rings 40 are provided about the extension tube 34 adjacent the ends thereof; the gaskets 40 being adapted to be axially compressed and radially-expanded upon tightening of the collars 37 and 38 thereby to provide fluid-tight seals intermediate the ends of the extension tube 34 and the fittings 24 and 39. The gaskets 40 (as well as the gaskets 27) may be backed by metal washers which are peripherally supported upon inwardly-extending annular shoulders formed on the housing 35 (as well as on the housing 21).

The extension fitting 39 is vertically apertured to permit cleaning of the extension tube 34; the lowermost end of the fitting 39 being closed by a screw-threaded plug 41. A sleeve 42 extends upwardly within the fitting 39 and into the lowermost end of the extension tube 34; the sleeve 42 serving as a bottom stop for a metering float to be hereinafter described.

The metering tube 20, which is the subject of my co-pending application Serial No. 535,624, filed May 15, 1944, is downwardly tapered throughout most of its length, that is, from its upper end to the point 43; a cylindrical inner bore 44 being provided at the lowermost portion of the tube 20, that is, from the point 43 to the lower end of the tube.

A plurality (for example three) of uniformly-circumferentially-distributed inwardly-protruding axially-extending float-guiding beads 45 are provided upon the tapered inner bore of the metering tube 20. The tips of the beads 45 extend generally parallel to the axis of the tube 20 and in direct continuation of the cylindrical inner bore 44. That is, the beads 45 are relatively pronounced at their upper ends and gradually become less pronounced downward along the tapered bore of the tube until they fade out completely at the point 43. As shown particularly in Figure 2, the beads 45 preferably terminate somewhat short of the upper end of the tube 20 in order to provide greater clearance to accommodate the lower end of the upper sleeve stop 33.

As will be described hereinbelow, the beads 45 provide parallel convex float-guiding shoulders or lands of small circumferential dimension which serve to center the metering floats to be hereinafter described along the axis of the tube 20 and to provide substantially frictionless centering support for the floats.

A metering float 46 is disposed within the tubes 20 and 34 as shown particularly in Figure 2. The float 46 includes an uppermost flow-constricting head portion 47 which is operatively disposed within the metering tube 20. The head portion 47 is in the form of a frusto-conical or cup-shaped member opening toward the lower end of the metering tube 20. The head portion 47 may be provided with a beveled periphery 48; the periphery 48 passing close to the tips of the float-guiding beads 45 so that the head 47 is maintained in position generally at the axis of the metering tube 20. The metering float 46 also includes a lowermost generally cylindrical weight-giving body portion 49 which is disposed within the cylindrical extension tube 34; the head 47 and the body portion 49 being connected by a thin elongated rod 50 passing through the conduit 29 of the fitting 24.

It is apparent that the metering float 46 is maintained in position generally axially of the metering tube 20 and is kept from "wobbling" by the novel supporting and guiding structure herein described. That is, the construction described above prevents "wobbling" or tilting or other undesirable oscillation of the metering float; the uppermost head portion 47 being centered by the float-guiding beads 45 with a minimum of friction while the lowermost body portion 49 is centered by the cylindrical extension tube 34.

As is well known in the art, the flow-constricting head portion will move vertically within the metering tube 20 responsive to variations in the rate-of-flow of fluid upwardly therethrough.

As disclosed in my Patent No. 2,350,343, issued June 6, 1944, the novel cup-shaped metering head construction described above renders the metering float 46 relatively insensitive to, and unaffected by, variations in the viscosity of the fluid. Thus, the position of the flow-constricting head 47 of the metering float 46 within the metering tube 20 is determined solely by the rate-of-flow of fluid upwardly through said tube; the float 46 remaining generally constant at constant rate-of-flow regardless of variations in fluid viscosity.

I also provide, within the metering tube 20, a second float 51 which may be in the form of a simple imperforate cylinder having a diameter slightly less than that of the cylindrical bore 44 of the tube 20 whereby said float 51 is guided and centered by the beads 45.

The float 51 is relatively sensitive to, and affected by, any variations in the fluid viscosity. Thus, the position of the float 51 within the metering tube 20 is the result of viscosity-effect as well as rate-of-flow. In other words, the height of the float 51 within the tube 20 is an indication of the cumulative effect of both rate-of-flow and viscosity.

In the embodiment of Figures 1 to 4, I prefer to provide a scale 52 which is attached to the outside of the housing 21. The scale 52 is provided with a reference mark or arrow 53.

Both floats 46 and 51 have a specific gravity somewhat greater than that of the fluid to be metered so that, when there is no upward flow of fluid through the tube 20, the two floats are in their lowermost position; the body portion 49 of the float 46 resting against the lower stop sleeve 42 and the float 51 resting against the top of the head portion 47 of the float 46.

As is well known in the art, upward flow of fluid through the tube 20 will tend to lift the metering floats upward within said tube. However, the viscosity effect of the fluid will tend to lift the float 51 higher within the tube 20 than the float 46; the greater viscosity, the greater the differential in the positions of the two floats.

In the embodiment of Figures 1 to 4, I prefer to determine viscosity directly by adjusting (either manually or automatically) the rate-of-flow of the fluid to a predetermined value at which the periphery of the flow-constricting head portion 47 of the metering float 46 is directly opposite the reference arrow 53 of the scale 52 as shown in Figure 1. With the float 46 in this position, the scale 52 is so calibrated with reference to the fluid being metered, that the position of the float 51 relative to the scale 52 will be a direct indication of the viscosity of the fluid.

Furthermore, variations in the position of the float 51 (while the rate-of-flow and the position of the float 46 are maintained constant) indicate corresponding variations in the viscosity of the flowing fluid.

In this way, a constant check can be maintained upon the viscosity of the flowing fluid.

It is obvious that the heads or fittings 23 and 24 can be rotated throughout horizontal planes to permit connection of the inlet and outlet openings 28 and 30 to horizontal pipe-lines extending in any direction relative to each other. This rotation of the fittings 23 and 24 is done before the collars 25 and 26 are fastened in position after which the inlet and outlet openings are locked in predetermined relationship to each other by tightening of the collars.

In Figures 5 to 8 I have shown another embodiment of the present invention wherein I may provide a vertical metering tube 120 (to be hereinafter described in detail) having its lower and upper ends 121 and 122 disposed in fluid-tight relationship within stuffing-boxes 123 and 124 of lower and upper rotameter "heads" or "fittings" 125 and 126 respectively; fluid-tight seals being provided by lower and upper packing rings 127 and 128 and lower and upper stuffing-glands 129 and 130 in conventional manner. The heads 125 and 126 are held in spaced relationship by a plurality (for example four) of spacer rods or posts 131; the lower head is adapted to be screw-threadedly connected to a horizontal inlet pipe-line 132 while the upper head 126 is adapted to be screw-threadedly connected to a horizontal outlet pipe-line 133.

A generally cylindrical extension tube or chamber 134 is mounted upon the upper end of the upper head 126 in axial alignment with the metering tube 120. The lower end of the extension tube 134 is connected in fluid-tight relationship within an upper stuffing-box 135 formed in said head 126 by means of packing rings 136 and a stuffing-gland 137.

The upper end of the extension tube 134 is mounted in fluid-tight relationship within the stuffing-box 138 of an uppermost fitting 139 by means of packing rings 140 and a stuffing gland 141; the fitting 139 being mounted in spaced relationship upon the head 126 by means of a plurality (for example four) of spacer rods or posts 42.

The metering tube 120 is downwardly tapered throughout most of its length, that is, from its upper end 122 to the point 143; a cylindrical inner bore 144 being provided at the lower portion of the tube 120, that is, from the point 143 to the lower end 121.

A plurality (for example three) of uniformly-circumferentially-distributed inwardly-protruding axially-extending float-guiding beads 145 are provided upon the tapered inner bore of said metering tube 120. The tips of the beads 145 extend generally parallel to the axis of the tube 120 and in direct continuation of the cylindrical inner bore 144. That is, the beads 145 are relatively pronounced at the upper larger end of the tube 120 and gradually become less pronounced downward along the tapered bore of the tube until they fade out completely at the point 143.

As will be hereinafter described, the beads 145 provide parallel float-guiding shoulder or lands which serve to center the metering float along the axis of the tube.

A main metering float 146 is mounted within the tubes 120 and 134 as shown particularly in Figure 5.

The float 146, as can best be seen in Figure 8, includes a lowermost flow-constricting head portion 147 which is operatively disposed within the metering tube 120. The head portion 147 is in the form of a conical or cup-shaped member opening toward the lower inlet end 121 of the metering tube 120. The head portion 147 may be provided with a beveled periphery 148; the periphery 148 passing close to the tips of the float-guiding beads 145 as can be seen particularly in Figure 7 so that the metering head 147 is maintained in position generally at the axis of the metering tube 120.

The main metering float 146 also includes an uppermost weight-giving body portion 149 which is disposed within the extension tube 134; the metering head 147 and the body portion 149 being connected by a thin elongated rod 150.

It is apparent that the main metering float 146 is maintained in position generally axially of the metering tube 120 and is kept from "wobbling" by the novel supporting and guiding structure herein described. That is, the novel construction described hereinabove, prevents "wobbling" or tilting or other undesirable oscillation of the metering float due to the fact that the lowermost head portion 147 is centered by the float-guiding beads 145 while the uppermost body portion 149 and the connecting rod 150 are centered by the extension tube 134.

Where the extra weight is not needed, the weight-giving portion 149 may be omitted entirely; in which case, the extension tube 134 is made small in diameter so as more snugly to receive and guide the upwardly-extending rod 150.

As is well known in the art, the flow-constricting head portion 147 will move vertically within the metering tube 120 responsive to variations in the rate-of-flow of fluid upwardly therethrough; the position of the head portion 147 within the tube 120 (as read off against suitable calibrations, which either may be applied directly to the outside of the tube or may be applied to a separate scale disposed in juxtaposition to the tube) being an indication of the rate-of-flow of fluid upwardly through the tube 120.

As discussed hereinabove, the cup-shaped metering head construction gives rate-of-flow readings which are relatively insensitive to, and unaffected by, variations in the viscosity of the fluid. So far as I know, this is due to the extreme turbulence in fluid flow-pattern which is caused by the fluid-entrapping pocket construction of the metering head.

In other words, the position of the flow-constricting head 147 of the main metering float 146 within the metering tube 120 is a measure of the rate-of-flow of fluid upwardly through said tube.

I also provide, within the metering tube 120 a secondary float 151. The secondary float 151 which is generally in the form of a "tear-drop" having a slightly enlarged flow-constricting periphery 152 (the periphery 152 having the same diameter as the periphery 148 of the main float 146) is provided with an axial opening 153 therethrough whereby the secondary float 151 can be slidably mounted upon the thin elongated connecting rod portion 150 of the main float 146. To facilitate installation and removal of the secondary float 151, the body portion 149 of the main float 146 may be made removable from the upper end of the connecting rod 150.

The secondary float 151 is relatively sensitive to, and affected by, variations in the fluid viscosity. Thus, the position of the secondary float 151 within the metering tube 120 is the result of viscosity-effect as well as rate-of-flow. In other words, the height of the secondary float within the tube 120 is an indication of the cumulative effect of both rate-of-flow and viscosity.

It is apparent that the difference in positions of the main float 146 and the secondary float 151 will be an indication of the viscosity of the fluid and that variations in this difference will be an indication of corresponding variations in the viscosity of the fluid.

In order that the secondary float 151 be, at all measurable flow-rates, somewhat above the head portion 147 of the main metering float 146, I prefer to make the secondary float slightly less in weight than the main float.

Where the secondary float 151 is made slightly less in weight than the main float 146, it is necessary to provide separate scales 154 and 155 for the secondary float and the main float to compensate for the lighter float's tendency to rise higher at a given rate-of-flow. The scales 154 and 155 may be either direct reading scales as in the embodiment of Figure 1 to show viscosity directly or, alternatively, they may be calibrated in arbitrary units from which viscosity can be calculated by reference to a suitable table or chart.

It is apparent that the viscosity of the flowing fluid as well as variations in such viscosity can quickly and easily be determined by simply reading off the positions of the two floats relative to their respective scales.

In Figures 9 to 12 I have shown still another modification of the present invention. In this embodiment, I may provide an unbeaded tapered metering tube 120—a which is vertically mounted intermediate lower and upper heads 125 and 126 of the frame in the same manner as described hereinabove in connection with the embodiment of Figure 5.

An extension tube 134 is provided at the upper end of the upper head 126 as also described in connection with the embodiment of Figure 5.

Since the metering tube 120—a does not have float-guiding beads formed thereon, it is necessary to provide a guide-rod 167 (extending axially along the metering tube 120—a and the extension tube 134) which is mounted at its ends in the lower head 125 and the uppermost fitting 139; screw-threaded adjustment means being provided for said guide-rod 167 at its lower and upper ends as at 168 and 169 respectively.

Lower and upper spiders 170 and 171 may be provided upon the guide-rod 167, the lower spider 170 being generally adjacent the lower end of the metering tube 120 and the upper spider 171 being generally adjacent the upper end of the extension tube 134.

In this embodiment, I may provide a main metering float 172 having a lowermost conical flow-constricting head portion 173 disposed within the metering tube 120—a, an apertured weight-giving body portion 174 disposed within the extension tube 134 and a thin elongated tube 175 connecting the head portion 173 and the body portion 174.

As can be seen particularly in Figure 12, the float 172 is slidably mounted upon the guide-rod 167 and is adapted for free up-and-down movement therealong. The metering float 172 is generally insensitive to, and unaffected by, variations in fluid viscosity so that its position within the metering tube 120—a is determined solely by the rate-of-flow of fluid passing upwardly through said tube.

A secondary float 176 having an axial opening 177 therethrough is slidably mounted upon the connecting tube 175 of the main float 172; the float 176 being disposed within the metering tube 120—a above the flow-constricting head 173 of said main float 172.

The float 176 is generally cylindrical with a beveled upper edge 178 and a lower tapered tail 179.

The secondary float 176 is sensitive to, and affected by, variations in fluid viscosity so that its position within the tapered metering tube 120—a is an indication of the cumulative effect of both viscosity and rate-of-flow. As described hereinabove, the difference in height of the two floats is an indication of the viscosity of the flowing fluid.

Again, I prefer to make the secondary float 176 somewhat less in specific gravity so that it will be somewhat higher than the head 173 of the main float 172 at all measurable flow-rates.

Separate scales 154 and 155 are again provided to compensate for this difference in specific gravity and it is apparent that the difference in positions of the two floats (as read off against their respective scales) is an indication of the viscosity and that variations in this difference indicate corresponding variations in the fluid viscosity.

While for purposes of simplicity of illustration, the scales 154 and 155 have been shown as disposed on opposite sides of the metering tube, the present invention contemplates that the scales can be arranged in different ways. Thus, for example, the scales may be close to each other adjacent the front part of the tube so that the position of the floats can be read off against the scales by observing the floats through the small space intervening the scales.

All of the metering floats described hereinabove have a specific gravity substantially greater than that of the fluids being metered so that they are not appreciably affected by and are relatively insensitive to any changes in specific gravity of the fluid as might occur during passage of the fluid through the pipe-line or the like.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A device for determining the viscosity of a moving fluid comprising a vertical metering tube having vertically-varying cross-sectional area available for fluid flow and adapted for vertical flow of fluid therethrough, an extension chamber in communication with said metering tube and generally in vertical alignment therewith, a metering float having a flow-constricting head portion disposed within said metering tube and having a body portion disposed within said extension chamber, said metering float being adapted for free up-and-down movement responsive to variations in rate-of-flow of fluid through said metering tube, and being relatively insensitive to variations in viscosity of said fluid, and a second float disposed within said metering tube, said second float being sensitive to and affected by variations in both rate-of-flow and viscosity whereby differences in positions of the two floats will be an indication of the viscosity of said fluid.

2. A device for determining the viscosity of a moving fluid comprising a vertical metering tube having vertically-varying cross-sectional area available for fluid flow and adapted for vertical flow of fluid therethrough, an extension chamber in communication with said metering tube and generally in vertical alignment therewith, a metering float having a flow-constricting head portion disposed within said metering tube and having a body portion disposed within said extension chamber, said metering float being adapted for free up-and-down movement responsive to variations in rate-of-flow of fluid through said metering tube, and being relatively insensitive to variations in viscosity of said fluid, a second float disposed within said metering tube, said second float being sensitive to and affected by variations in both rate-of-flow and viscosity whereby differences in positions of the two floats will be an indication of the viscosity of said fluid, and means for guiding said floats generally along the axis of said metering tube.

3. A device for determining the viscosity of a moving fluid comprising a vertical tapered metering tube having a plurality of circumferentially-spaced axially-extending inwardly-protruding beads formed thereon, a cylindrical extension tube in communication with said metering tube and generally in vertical alignment therewith, a metering float having a flow-constricting head portion disposed within said metering tube and having a body portion disposed within said extension tube, said metering float being adapted for free up-and-down movement within said metering tube responsive to variations in rate-of-flow of fluid through said metering tube and being relatively insensitive to variations in viscosity of said fluid, and a second float disposed within said metering tube, said second float being sensitive to and affected by variations in both rate-of-flow and viscosity of said fluid, said beads and said extension tube serving to center said first-mentioned float generally along the axis of said metering tube, said second float being centered along the axis of said metering tube by said beads.

4. A device for determining the viscosity of a moving fluid comprising a vertical tapered metering tube having a plurality of circumferentially-spaced axially-extending inwardly-protruding beads formed thereon, a cylindrical extension tube in communication with said metering tube and generally in vertical alignment therewith, a metering float having a flow-constricting head portion disposed within said metering tube and having a body portion disposed within said extension tube, said metering float being adapted for free up-and-down movement within said metering tube responsive to variations in rate-of-flow of fluid through said metering tube and being relatively insensitive to variations in viscosity of said fluid, a second float disposed within said metering tube, said second float being sensitive to and affected by variations in both rate-of-flow and viscosity of said fluid, said beads and said extension tube serving to center said first-mentioned float generally along the axis of said metering tube, said second float being centered along the axis of said metering tube by said beads, and a scale provided for said metering tube, said scale having a reference point which with said first-mentioned float is adapted to indicate a predetermined rate-of-flow of said fluid, said scale being calibrated so that the position of the second float relative thereto will indicate the viscosity of the fluid when the first-mentioned float is opposite said reference point.

5. A device for determining the viscosity of a moving fluid comprising a vertical metering tube having vertically-varying cross-sectional area available for fluid flow and having a plurality of circumferentially-spaced axially-extending inwardly-protruding float-guiding beads formed thereon, a cylindrical extension tube disposed below said metering tube and in communication therewith, a metering float having a flow-constricting head portion disposed within said metering tube and having a body portion disposed within said extension tube, said metering float being adapted for free up-and-down movement responsive to variations in rate-of-flow of fluid upward through said metering tube and being relatively insensitive to variations in viscosity of said fluid, and a second float disposed within said metering tube within said first-mentioned float; said second float being sensitive to and affected by variations in both rate-of-flow and viscosity.

6. A device for determining the viscosity of a moving fluid comprising a vertical metering tube having vertically-varying cross-sectional area available for fluid flow and having a plurality of circumferentially-spaced axially-extending inwardly-protruding float-guiding beads formed thereon, a cylindrical extension tube disposed below said metering tube and in communication therewith, a metering float having a flow-constricting head portion disposed within said metering tube and having a body portion disposed within said extension tube, said metering float being adapted for free up-and-down movement responsive to variations in rate-of-flow of fluid upward through said metering tube and being relatively insensitive to variations in viscosity of said fluid, a second float disposed within said metering tube within said first-mentioned float; said second float being sensitive to and affected by variations in both rate-of-flow and viscosity, and a scale for said metering tube, said scale having a reference point and being calibrated so that the position of said second float relative thereto will indicate the viscosity of said fluid when said first-mentioned float is opposite said reference point.

7. A device for determining the viscosity of a moving fluid comprising a vertical metering tube having vertically-varying cross-sectional area available for fluid flow, a generally cylindrical extension tube disposed below said metering tube and in communication therewith, a metering float having a flow-constricting head portion disposed within said metering tube and having a body portion disposed within said extension tube, said metering float being adapted for free up-and-down movement responsive to variations in rate-of-flow of fluid through said metering tube and being relatively insensitive to variations in viscosity of said fluid, and second float disposed within said metering tube, said second float being sensitive to and affected by variations in both rate-of-flow and viscosity whereby the differences in positions of the two floats will indicate the viscosity of said fluid.

8. A device for determining the viscosity of a moving fluid comprising a vertical metering tube having vertically-varying cross-sectional area available for fluid flow, a generally cylindrical extension tube disposed below said metering tube and in communication therewith, a metering float having a flow-constricting head portion disposed within said metering tube and having a body portion disposed within said extension tube, said metering float being adapted for free up-and-down movement responsive to variations in rate-of-flow of fluid through said metering tube and being relatively insensitive to variations in viscosity of said fluid, a second float disposed within said metering tube, said second float being sensitive to and affected by variations in both rate-of-flow and viscosity whereby the differences in positions of the two floats will indicate the viscosity of said fluid, and means for guiding said floats generally along the axis of said metering tube.

9. A device for determining the viscosity of a moving fluid comprising a downwardly-tapered vertical metering tube having a plurality of circumferentially-spaced axially-extending inwardly-protruding float-guiding beads formed thereon, a generally cylindrical extension tube disposed above said metering tube and being in communication therewith, a metering float having a flow-constricting head portion disposed within said metering tube and having a weight-giving body portion disposed within said extension tube and having a relatively thin elongated connecting portion intermediate said head portion and body portion, said metering float being adapted for free up-and-down movement responsive to variations in rate-of-flow of fluid through said metering tube and being relatively insensitive to variations in viscosity of said fluid, and an axially-apertured second float mounted upon said thin elongated connecting portion and being adapted for free up-and-down movement within said metering tube, said second float being sensitive to and affected by variations in both rate-of-flow and viscosity whereby the differences in positions of the two floats will indicate the viscosity of said fluid.

10. A device for determining the viscosity of a moving fluid comprising a vertical metering tube having vertically varying cross-sectional area available for fluid flow, a generally cylindrical extension tube disposed above said metering tube and being in communication therewith, a metering float having a flow-constricting head portion disposed within said metering tube and having a weight-giving body portion disposed within said extension tube and having a relatively thin elongated connecting portion intermediate said head portion and body portion, said metering float being adapted for free up-and-down movement responsive to variations in rate-of-flow of fluid upward through said metering tube and being relatively insensitive to variations in viscosity of said fluid, an axially-apertured second float mounted upon said thin elongated connecting portion and being adapted for free up-and-down movement within said metering tube, said second float being sensitive to and affected by variations in both rate-of-flow and viscosity whereby the differences in positions of the two floats will indicate the viscosity of said fluid, and means for guiding said first-mentioned float axially along said metering tube.

11. A device for determining the viscosity of a moving fluid comprising a vertical metering tube having vertically-varying cross-sectional area available for fluid flow, a generally cylindrical extension tube disposed above said metering tube and being in communication therewith, a metering float having a flow-constricting head portion disposed within said metering tube and having a weight-giving body portion disposed within said extension tube and having a relatively thin elongated connecting portion intermediate said head portion and body portion, said metering float being adapted for free up-and-down movement responsive to variations in rate-of-flow of fluid upward through said metering tube and being relatively insensitive to variations in viscosity of said fluid, an axially-apertured second float mounted upon said thin elongated connecting portion and being adapted for free up-and-down movement within said metering tube, said second float being sensitive to and affected by variations in both rate-of-flow and viscosity whereby the differences in positions of the two floats will indicate the viscosity of said fluid, and means for guiding said first-mentioned float axially along said metering tube, said last-mentioned means including a thin taut guide-wire passing through said first-mentioned metering float and extending along the axes of said tubes.

12. A device for determining the viscosity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid viscosity and having a flow-constricting head portion and an elongated stem extending upwardly from said head portion, and a second metering float disposed within said tube, said second float being sensitive to variations in both rate-of-flow and viscosity, said second float being provided with a central axial opening and being mounted upon said stem for free up-and-down movement therealong.

13. A device for determining the viscosity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid viscosity and having a flow-constricting head portion and an elongated stem extending upwardly from said head portion, and a second metering float disposed within said tube, said second float being sensitive to variations in both rate-of-flow and viscosity, said second float being provided with a central axial opening and being mounted upon said stem for free up-and-down movement therealong, said tube being provided with a plurality of circumferentially-spaced inwardly-protruding axially-extending beads providing parallel line-contacts for float-guidance.

14. A device for determining the viscosity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid viscosity and a second metering float disposed within said tube above said first-mentioned float, said second float being sensitive to variations in both rate-of-flow and viscosity, said tube being provided with a plurality of circumferentially-spaced inwardly-protruding axially-extending beads providing parallel line-contacts for float guidance.

15. A device for determining the viscosity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid viscosity and having a flow-constricting head portion and an elongated hollow stem extending upwardly from said head portion, a second metering float disposed within said tube, said second float being sensitive to variations in both rate-of-flow and viscosity, said second float being provided with a central axial opening and being mounted upon said stem for free up-and-down movement therealong, and a thin taut guide-wire extending along the axis of said tube and through said stem.

KERMIT FISCHER.

REFERENCES CITED

The following references are of record in the file of this patent:

UNITED STATES PATENTS

| Number | Name | Date |
|---|---|---|
| 2,348,732 | Fischer | May 16, 1944 |
| 2,333,884 | Porter | Nov. 9, 1943 |
| 2,377,861 | Brewer | June 12, 1945 |
| 2,252,883 | Everson | Aug. 19, 1941 |

FOREIGN PATENTS

| Number | Country | Date |
|---|---|---|
| 672,025 | Germany | Feb. 18, 1939 |